United States Patent Office.

WILLIAM GELLER, OF NEW YORK, N. Y.

Letters Patent No. 109,000, dated November 8, 1870.

IMPROVEMENT IN COMPOSITIONS FOR PENCILS.

The Schedule referred to in these Letters Patent and making part of the same.

*To all whom it may concern:*

Be it known that I, WILLIAM GELLER, of the city, county, and State of New York, have invented a new and Improved Composition for Pencils; and I do hereby declare that the following is a full, clear, and exact description thereof, which will enable others skilled in the art to make and use the same.

This invention relates to a novel composition for pencils or marking instruments, and consists in the use of potato pulp for that purpose.

The potatoes to be used for pencils are first boiled and peeled, then mashed to a fine pulp, and mixed with coloring matter, which may be lamp-black, ultramarine, vermillion, or other suitable substance.

I also prepare brown soap with coloring matter, and agitate it to produce a thorough mixture. The potato and soap pulps are then mixed together and stirred till completely united.

For soft pencils I use two parts of the potato pulp together with one part of soap. The harder the pencil is to be made the more soap is employed.

For making the matter still more adhesive, stearine may be added.

The compound, when properly prepared, is put into a suitable form and allowed to dry therein, and can be used with or without a suitable handle.

It is evident that pencils made on this plan will be cheap and durable.

They can be made soft, to be used as crayons by artists, or hard, for carpenters' use.

Having described my invention,

I claim as new and desire to secure by Letters Patent—

1. The combination of potato pulp with any suitable coloring matter, to form a composition for pencils, substantially as set forth.

2. The herein-described composition for pencils, crayons, &c.

The above specification of my invention signed by me this 27th day of August, 1870.

WILLIAM GELLER.

Witnesses:
 GEO. W. MABEE,
 ALEX. F. ROBERTS.